US008019370B2

(12) United States Patent
Sengupta et al.

(10) Patent No.: US 8,019,370 B2
(45) Date of Patent: Sep. 13, 2011

(54) METHOD AND APPARATUS FOR A POWER-EFFICIENT FRAMEWORK TO MAINTAIN DATA SYNCHRONIZATION OF A MOBILE PERSONAL COMPUTER TO SIMULATE A CONNECTED SCENARIO

(75) Inventors: Uttam Sengupta, Portland, OR (US); Prashant Gandhi, Santa Clara, CA (US); Shobhit Varshney, Jersey City, NJ (US); Mandar Joshi, Portland, OR (US); Shreekant Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/786,299

(22) Filed: May 24, 2010

(65) Prior Publication Data
US 2010/0235504 A1 Sep. 16, 2010

Related U.S. Application Data

(63) Continuation of application No. 11/393,207, filed on Mar. 29, 2006, now Pat. No. 7,725,093.

(51) Int. Cl.
*H04B 7/00* (2006.01)
*H04B 15/00* (2006.01)
*H04B 1/38* (2006.01)
*H04B 1/16* (2006.01)
(52) U.S. Cl. ............ 455/502; 455/574; 455/343.5
(58) Field of Classification Search .......... 455/574, 455/571, 343.1, 343.2, 502, 343.5
See application file for complete search history.

(56) References Cited

U.S. PATENT DOCUMENTS

| | | | | |
|---|---|---|---|---|
| 6,016,312 | A * | 1/2000 | Storm et al. | 370/311 |
| 6,192,230 | B1 * | 2/2001 | van Bokhorst et al. | 455/343.3 |
| 6,330,234 | B1 * | 12/2001 | Tomasi et al. | 370/342 |
| 6,615,033 | B1 * | 9/2003 | Cragun | 455/502 |
| 6,889,055 | B1 * | 5/2005 | Neufeld | 455/458 |
| 2003/0195019 | A1 * | 10/2003 | Litwin | 455/574 |
| 2005/0130705 | A1 | 6/2005 | Shin | |
| 2005/0233780 | A1 * | 10/2005 | Jani et al. | 455/574 |
| 2006/0116178 | A1 | 6/2006 | Vuong et al. | |
| 2006/0194624 | A1 | 8/2006 | Hsieh et al. | |
| 2006/0205444 | A1 | 9/2006 | Aerrabotu et al. | |
| 2006/0240798 | A1 * | 10/2006 | Jarosinski et al. | 455/343.1 |
| 2006/0276160 | A1 | 12/2006 | Romano et al. | |

* cited by examiner

*Primary Examiner* — Tilahun B Gesesse
(74) *Attorney, Agent, or Firm* — Blakely, Sokoloff, Taylor & Zafman LLP

(57) ABSTRACT

An apparatus and method for a power-efficient framework to maintain data synchronization of a mobile personal computer (MPC) are described. In one embodiment, the method includes the detection of a data synchronization wakeup event while the MPC is operating according to a sleep state. Subsequent to wakeup event, at least one system resource is disabled to provide a minimum number of system resources required to re-establish a network connection. In one embodiment, user data from a network server is synchronized on the MPC without user intervention; the mobile platform system resumes operation according to the sleep state. In one embodiment, a wakeup alarm is programmed according to a user history profile regarding received e-mails. In a further embodiment, data synchronizing involves disabling a display, and throttling the system processor to operate at a reduced frequency. Other embodiments are described and claimed.

19 Claims, 12 Drawing Sheets

| Time (Hrs) | 12am | 1am | 2am | 3am | 4am | 5am | 6am | 7am | 8am | 9am | 10am | 11am | 12pm | 1pm | 2pm | 3pm | 4pm | 5pm | 6pm | 7pm | 8pm | 9pm | 10pm | 11pm |
|---|---|---|---|---|---|---|---|---|---|---|---|---|---|---|---|---|---|---|---|---|---|---|---|---|
| Average # of e-mails | 0.3 | 0 | 0 | 0 | 0 | 0 | 0.2 | 0.8 | 1.3 | 5.7 | 7.8 | 8.8 | 2.0 | 6.5 | 8.2 | 4.2 | 2.7 | 3.7 | 0.7 | 0.7 | 1.2 | 0.3 | 0.2 | 0 |
| Scheduled Wakeups | 0:00 | | | | | | | 7:36 | 8:30 | | | | | | | | | | | | | | | |
| | | | | | | | | | | 9:04 | 10:05 | 11:00 | 12:12 | 1:04 | 2:00 | 3:00 | 4:18 | 5:02 | 6:40 | | 8:05 | | | |
| | | | | | | | | | | 9:14 | 10:13 | 11:07 | 12:42 | 1:13 | 2:07 | 3:14 | 4:40 | 5:18 | | | 8:56 | | | |
| | | | | | | | | | | 9:25 | 10:21 | 11:14 | | 1:22 | 2:15 | 3:28 | | 5:34 | | | | | | |
| | | | | | | | | | | 9:35 | 10:29 | 11:21 | | 1:31 | 2:22 | 3:43 | | 5:51 | | | | | | |
| | | | | | | | | | | 9:46 | 10:37 | 11:28 | | 1:40 | 2:30 | 3:57 | | | | | | | | |
| | | | | | | | | | | 9:56 | 10:45 | 11:35 | | 1:50 | 2:37 | | | | | | | | | |
| | | | | | | | | | | | 10:53 | 11:42 | | | 2:45 | | | | | | | | | |
| | | | | | | | | | | | | 11:49 | | | 2:52 | | | | | | | | | |
| | | | | | | | | | | | | 11:56 | | | | | | | | | | | | |

273

METHOD AND APPARATUS FOR A POWER-EFFICIENT FRAMEWORK TO MAINTAIN DATA SYNCHRONIZATION OF A MOBILE PERSONAL COMPUTER TO SIMULATE A CONNECTED SCENARIO

CROSS-REFERENCE TO RELATED APPLICATION

This Patent Application is a continuation of U.S. patent application Ser. No. 11/393,207, entitled "Method and Apparatus for a Power-Efficient Framework to Maintain Data Synchronization of a Mobile Personal Computer to Simulate A Connected Scenario", filed Mar. 29, 2006, now issued as U.S. Pat. No. 7,725,093, dated May 25, 2010.

FIELD

One or more embodiments relate generally to the field of integrated circuit and computer system design. More particularly, one or more of the embodiments relate to a method and apparatus for a power-efficient framework to maintain data synchronization of a mobile personal computer to simulate a connected scenario.

BACKGROUND

E-mails are steadily becoming a mainstream mode of communication, between friends, family and especially work colleagues. With this increasing reliance on e-mails, it is important to remain constantly up-to-date with e-mails/online alerts. Today, users of devices such as Blackberry® and Palm Treo® can get e-mail continuously on their devices through a technique called "push e-mail." However, push e-mail, currently, does not work on notebook computers and many other mobile devices because it requires a specialized always-on wireless communication sub-system. To stay up-to-date, users of notebooks and other web-enabled mobile devices have to manually establish connection with their application servers (web and/or enterprise) and download e-mails, weather, news and entertainment items one by one. Unlike push e-mail, where the servers push content to the user's mobile devices, users of notebook PC have to pull information off the respective servers.

Conventionally, a corporate executive is required to pickup his/her laptop, establish a connection to the Internet, take care of security/passwords, etc., and then synchronize information one by one. Unless he/she does all of this, he/she is unaware of any important e-mails/critical updates, such as flights delays, meeting changes, etc. Also, when he/she tries to do this, he/she needs to have Internet connectivity at his/her current location.

Keeping a laptop constantly powered on and connected wirelessly is not feasible because of power limitations of today's devices. A typical laptop's battery lasts about five hours. However, almost all mobile devices today are capable of entering a lower power "Sleep/Standby/Hibernate" state to conserve battery power when not in active use. To conserve battery power, an individual either would places his/her mobile device in the "Standby/Hibernate" state, or the device itself, if left idle, enters the state. Unfortunately, during such low power states, the device powers down much of the resources of the computer system, generally resulting in the loss of network connections. As a result, data on the mobile device does not remain synchronized with subsequently receive data by a network server.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for a power-efficient framework to maintain data synchronization of a mobile personal computer (MPC) in a connected scenario are described. In one embodiment, the method includes the detection of a data synchronization wakeup event while a mobile platform (MPC) is operating according to a sleep state. Subsequent to the wakeup event, at least one system resource is disabled to provide a minimum number of system resources required to re-establish a network connection.

In one embodiment, user data from a network server is synchronized on the MPC system without user intervention and in a low power state, to provide the appearance to the user that the MPC system is connected. Once data synchronization is complete, the MPC system resumes operation according to the sleep state. In one embodiment, the data synchronization wakeup event is periodically invoked by programming a real-time clock according to a user history profile regarding received e-mails. In a further embodiment, synchronizing of system data in the low power state involves disabling one or more resources of the mobile platform system, including a display, and optionally throttling the system processor to operate at a reduced frequency.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

System

Figure 1:
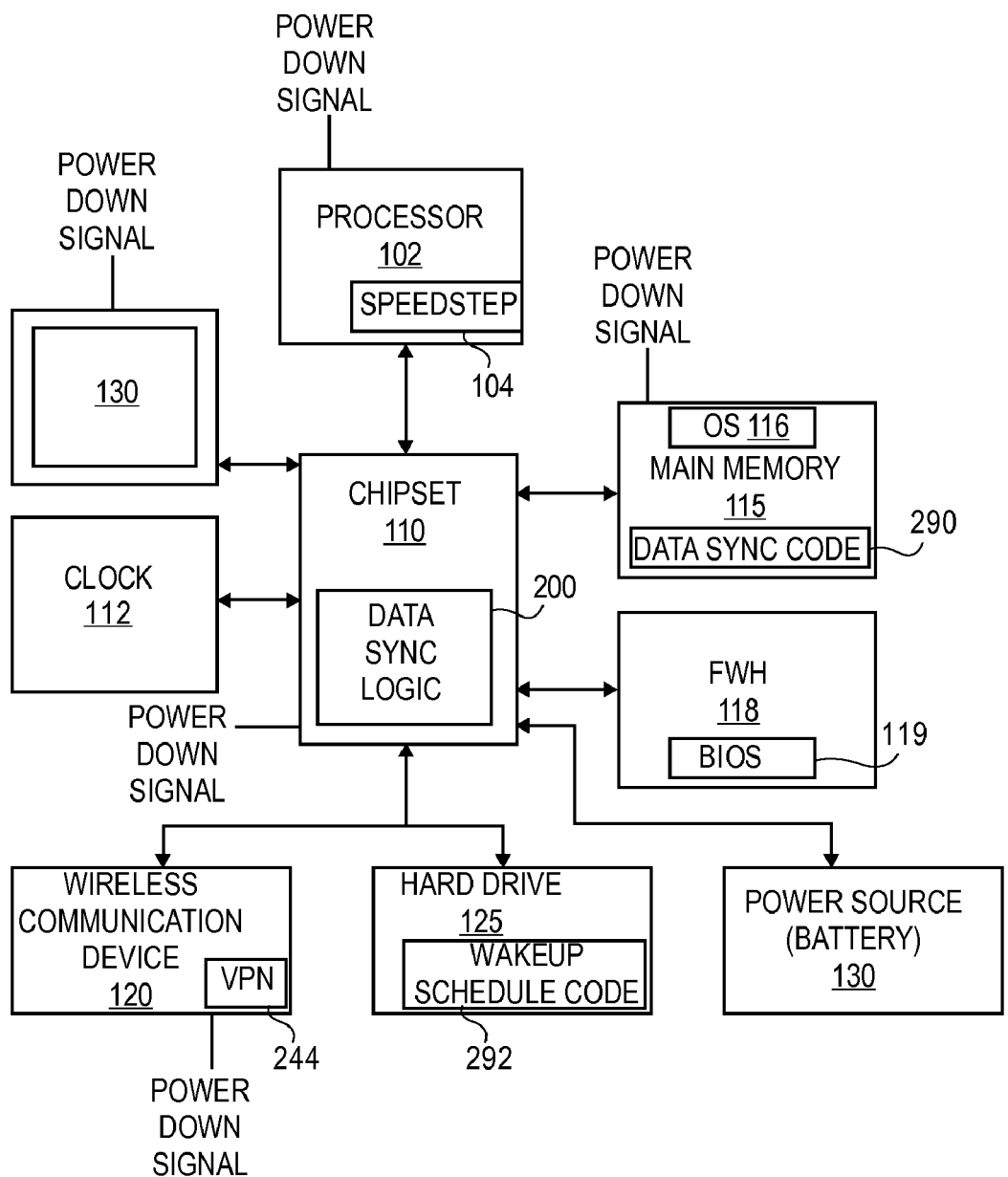
FIG. 1 is a block diagram illustrating a mobile personal computer (MPC) system including data synchronization logic to enable a power efficient framework to maintain data synchronization of an MPC to simulate a connected scenario, in accordance with one embodiment.

FIG. 1 is a block diagram illustrating mobile personal computer (PC) (MPC) system 100 including data synchronization logic 200 to enable a power-efficient framework to maintain data synchronization of MPC system 100 to simulate a connected scenario, in accordance with one embodiment. As described herein, an "MPC system" may include, but is not limited to, laptop computers, notebook computers, handheld devices (e.g., personal digital assistants, cell phones, etc.), or other like battery powered devices.

Representatively, MPC system 100 comprises interconnect 104 for communicating information between processor (CPU) 102 and chipset 110. In one embodiment, CPU 102 may be a multi-core processor to provide a symmetric multiprocessor system (SMP). As described herein, the term "chipset" is used in a manner to collectively describe the various devices coupled to CPU 102 to perform desired system functionality.

Representatively, display 130, wireless communication device 120, hard drive devices (HDD) 125, main memory 115, clock 112 and power source (battery) 127 may be coupled to chipset 110. In one embodiment, chipset 110 is configured to include a memory controller hub (MCH) and/or an input/output (I/O) controller hub (ICH) to communicate with I/O devices, such as wireless communications device 120. In an alternate embodiment, chipset 110 is or may be configured to incorporate a graphics controller and operate as a graphics memory controller hub (GMCH). In one embodiment, chipset 110 may be incorporated into CPU 102 to provide a system on chip.

In one embodiment, main memory 115 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Representatively, computer system 100 further includes non-volatile (e.g., Flash) memory 150. In one embodiment, flash memory 150 may be referred to as a "firmware hub" or FWH, which may include a basic input/output system (BIOS) that is modified to perform, in addition to initialization of computer system 100, initialization of data sync logic 200 to enable a power-efficient framework to maintain data synchronization of MPC system 100 to simulate a connected scenario, according to one embodiment.

MPC systems, such as MPC system 100, laptop computers, notebook computers, handheld devices (e.g., personal digital assistants, cell phones, etc.) are often battery powered; and, as such, power consumption is a matter of concern. Typically, the less power consumed by a mobile computing system, the longer the life of the battery that powers the computing system. Often, mobile computing systems are built with a "standby mode" and/or a "hibernation mode," which are collectively referred to herein as "sleep modes/states." Either of these modes substantially shut down the activity of the computing system so that battery power is conserved.

In "standby mode," the computing system's "appendages" outside processor core 102 (e.g., its display unit 130, wireless communications device 120, HDD 125) are shut down in response to a corresponding POWER DOWN SIGNAL, while volatile memory within processing core 102 (e.g., external cache (not shown) system memory 115, etc.) is kept awake (e.g., by continuing to clock/refresh and/or otherwise apply power to external cache and system memory 115). In one embodiment, CPU 102 may also shut down various internal units so that the processing of application software effectively ceases. Standby mode allows the system to conserve battery power consumption (because of the shut down of the appendages and internal CPU units) and also allows the computing system to rapidly awake because its volatile memory was not shut down.

In "hibernation mode," the contents of the volatile memory (e.g., cache system memory 115) are first stored to non-volatile memory (e.g., HDD 125); and then, the entire system is effectively shut down. Here, typically, greater power savings are realized as compared to the sleep mode because the volatile memory units are shut down. However, it takes longer for the system to return from hibernation mode to its original, normal, active state because the "state" of the system software at the time hibernation mode was entered (as represented by the matter that was transferred from volatile to non-volatile memory) needs to be "reloaded" back into volatile memory (e.g., by reading the state data from the disk drive and restoring it back to its original locations in cache and system memory 115.)

Unfortunately, during either standby mode or hibernation mode, the utility of a mobile computing system is effectively non-existent because the CPU (being shut down) lacks the ability to execute a variety of instructions. That is, useful software routines (such as, e-mail retrieval, downloading information from the Internet, etc.) cannot be executed. In one embodiment, data sync logic 200 periodically makes an automatic wireless network connection to synchronize MPC system 100 with any data received by a network server, to simulate a connected scenario to a user of MPC system 100. As described herein, "data synchronization" or "synchronization" may refer to the downloading of all e-mail/critical information received by a network server to synchronize user data on MPC system 100 with user data on the network server without requiring user intervention for access to a network server via a wireless network connection.

Figure 2:
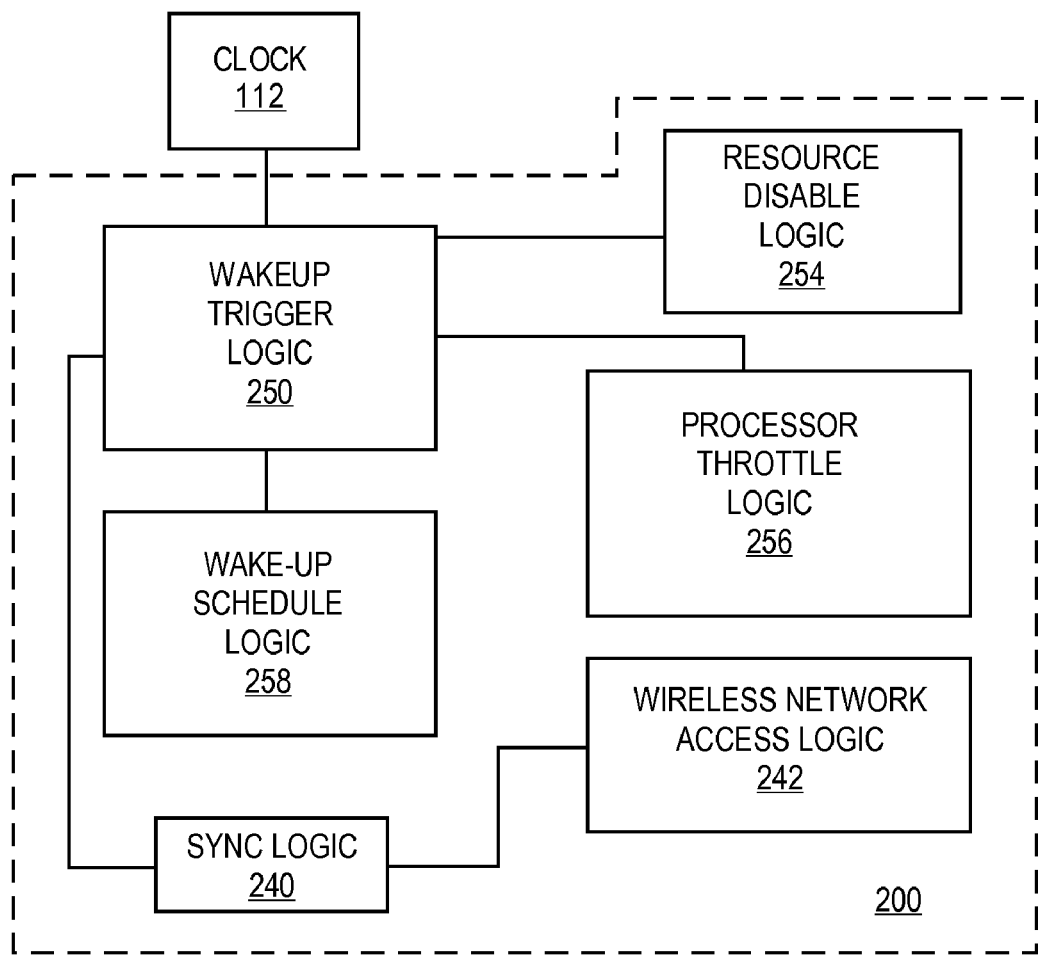
FIG. 2 is a block diagram further illustrating data synch logic of FIG. 1, in accordance with one embodiment.

FIG. 2 is a block diagram further illustrating data synchronization logic 200 of FIG. 1, in accordance with one embodiment. Representatively, sync logic 240 operates as a controller to ensure that data sync logic 200 periodically makes an automatic wireless network connection to synchronize MPC system 100 with any user data received by a network server. In one embodiment, wakeup schedule logic 258 is responsible for establishing a wakeup schedule when MPC system 100 is placed into a stand-by/hibernate mode, either directly (by the user) or due to user inactivity.

In one embodiment, in response to detection of the MPC system 100 in a stand-by/hibernate mode, wakeup schedule logic 258 is set a timer to occasionally wakeup MPC system 100 for synchronization. In one embodiment, this is performed by programming wakeup trigger logic 250. Wakeup trigger logic 250 receives real-time clock input 112 and based on a timer, issues a data synchronization event. In response to such data synchronization event, resources disable logic 250 disables at least one MPC system resource to provide a minimum number of resources required to re-establish a wireless network connection. Once disabled, sync logic 240 directs wireless network access logic 242 to establish a wireless network connection. Once established, sync logic 240 ensures that all user data on MPC system 100 is synchronized with any newly received user data on a network server.

Accordingly, referring again to FIG. 1, wireless communication device 120 may operate according to a wireless network protocol, such as, for example, the Institute of Electronic Engineers (IEEE) 802.11 Standard (e.g., IEEE Std. 802.11-1997, 802.11a, 802.11e, 802.11n, etc.). In one embodiment, wireless communications device may operate according to an 802.11 Standard for providing a mobile user with a connection to a local area network (LAN) through an radio frequency (RF) connection. However, it should be recognized that access to a wireless local area network (WLAN) is not limited to the 802.11 Standard, but may include HyperLan2, as well as future potential standards for any point-to-point wireless link or network. In one embodiment, wireless communication device 120 may provide support for a wireless network protocol for connection to a wireless wide area network (WWAN).

In one embodiment, wireless communications device 120 may include virtual private network (VPN) logic 244 for automating access to a wireless network without user intervention. Accordingly, in one embodiment, wireless network access logic 242 (FIG. 2), may be responsible for scanning all possible networks to make the best possible effort to establish Internet connectivity without user intervention. Subsequently, VPN logic 244 may establish a WLAN/WWAN secure connection to enable synchronization of all the e-mail/relevant information as specified by a user profile to simulate that MPC system 100 is connected to a network server. In one embodiment, a user may also be alerted if so desired before sending MPC system 100 back into a Standby/Hibernate mode. Accordingly, returning the MPC system 100 to a sleep mode following data synchronization, and reducing the periodicy of wakeups for maintaining synchronization, result in optimized battery lifetime.

Figure 3:
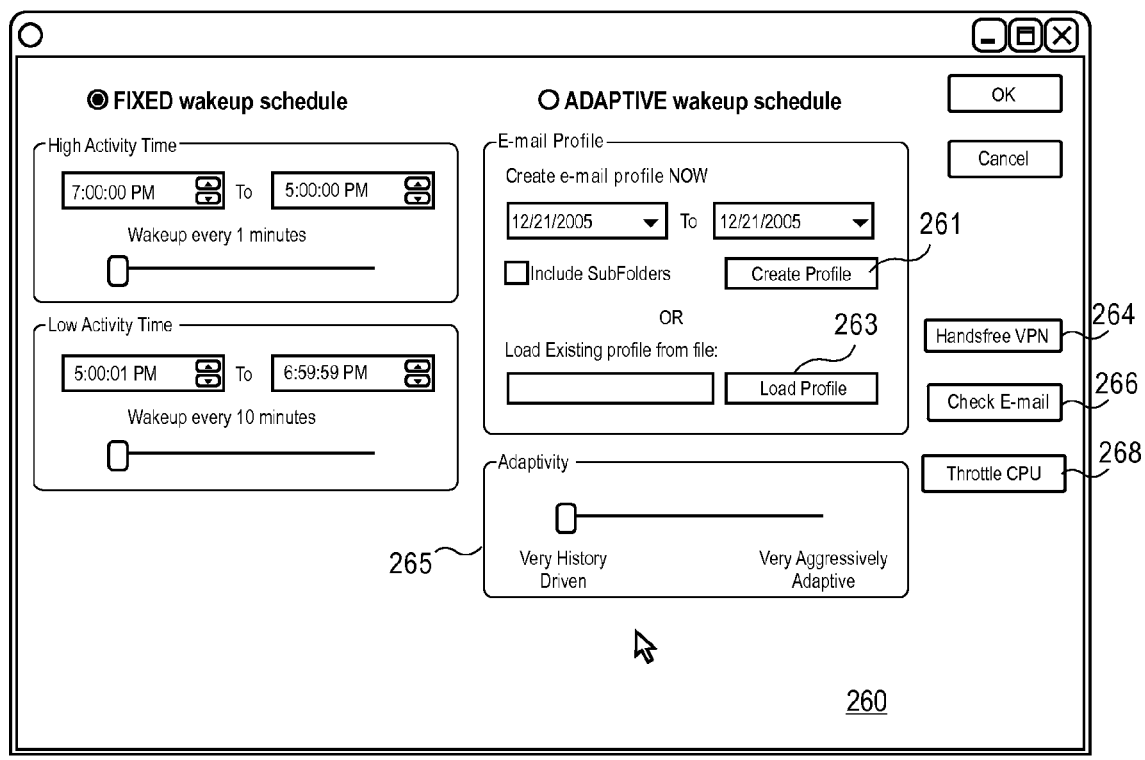
FIG. 3 is a user interface illustrating implementation of a fixed wakeup schedule for performing data synchronization, in accordance with one embodiment.
Figure 4:
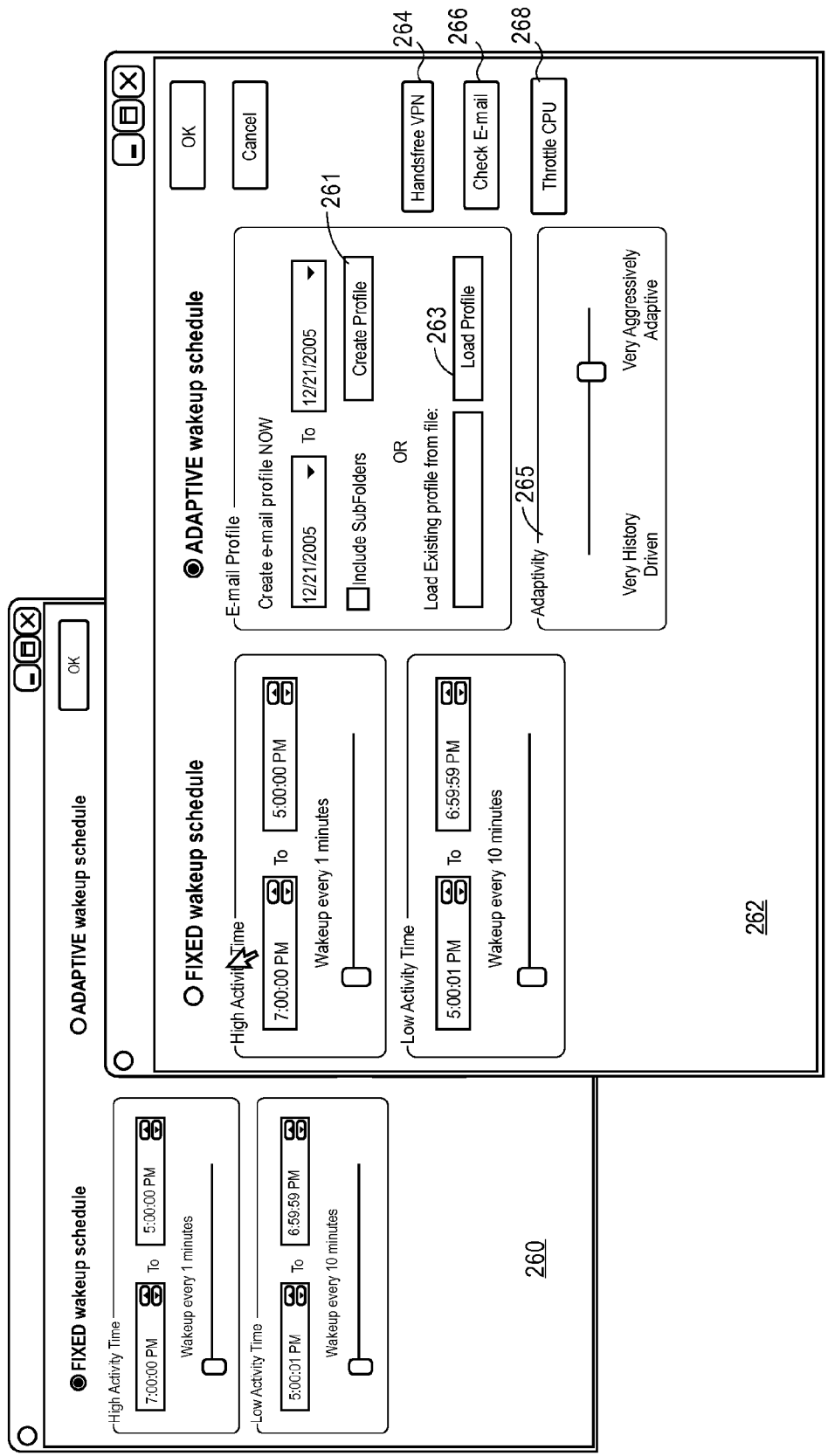
FIG. 4 is a user interface for implementing an adaptive wakeup schedule for performing data synchronization according to one embodiment.

FIGS. 3 and 4 illustrate user interfaces for providing a fixed wakeup schedule 260 and adaptive wakeup schedule 262, as provided by wakeup schedule code 292 of FIG. 1, according to one embodiment. As shown in FIG. 3, fixed wakeup schedule 262 allows the user to select a fixed time for periodically waking MPC system 100, while in a sleep state, to perform data synchronization, by activating "Check E-mail" button 266. However, to optimize battery lifetime, it is recognized that the periodicy of the wakeup and synchronization plays a critical role in balancing the power consumption versus having continuously synchronized data. In one embodiment, a scheme is proposed where the periodicy for determining/performing data synchronization is governed by e-mail activity.

Figure 5:
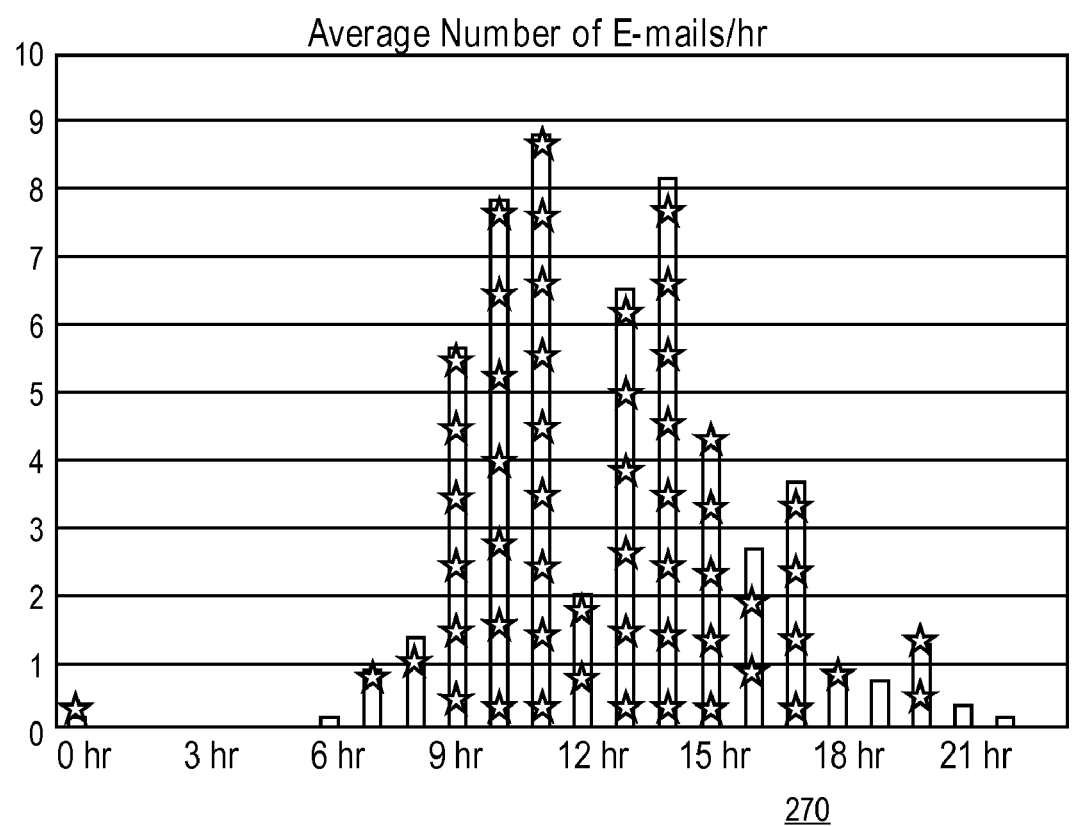
FIG. 5 is a graph illustrating an average number of e-mails received per hour, according to one embodiment.

In one embodiment, as shown in FIG. 4, an adaptive wakeup schedule user interface 262 is provided. In one embodiment, a history profile (Create Profile 261) may be generated based on e-mail usage to create a heuristic for wakeup times according to when a user is expected to receive an e-mail message. For example, as shown in FIG. 5, graph 270 illustrates the average number of e-mails received per hour based on a 24-hour period. Representatively, a user's e-mail history may tell us that the user rarely receives e-mail between 12:00 a.m. and 5:00 a.m. As a result, scheduling a wakeup of MPC system 100 during such times would result in wasted battery life. Conversely, between 8:00 a.m. an 11:00 a.m., it is identified that the user receives a high volume of e-mails. Consequently, it is beneficial to wakeup the MPC system more frequently during such period of time to maintain data synchronization. It should be recognized that the e-mail activity pattern may be different for different days of the week and whether or not the user is traveling or in a different time zone.

In one embodiment, adaptive wakeup schedule 262 enables a user to make the wake schedule more adaptive. Representatively, a user gets to decide whether the wake schedule is governed more by history or by incoming e-mails. If the user wants the wakeup schedule to reflect recent activity, the schedule may be aggressively updated with each incoming e-mail, using Adaptivity 265. For example, MPC system 100 is put in standby mode at 12:00 a.m., and wakeup occurs at 5:00 a.m., less than one e-mail is expected. If during this duration, four e-mails are received, an adaptive wakeup schedule may update to reflect this unusual activity.

In one embodiment, if Adaptivity 265 is set to be governed more by history, the received e-mails are considered as an unusual spike or outlier and the schedule is not adjusted. On the contrary, if the Adaptivity 265 is set to be governed more by incoming e-mails, the schedule is adapted aggressively and starts waking up more often between 12:00 a.m. and 5:00 a.m. Hence, Adaptivity 265 allows the user to easily set attributes like adaptivity coefficient and e-mail threshold for wakeups.

Figures 6, 7:
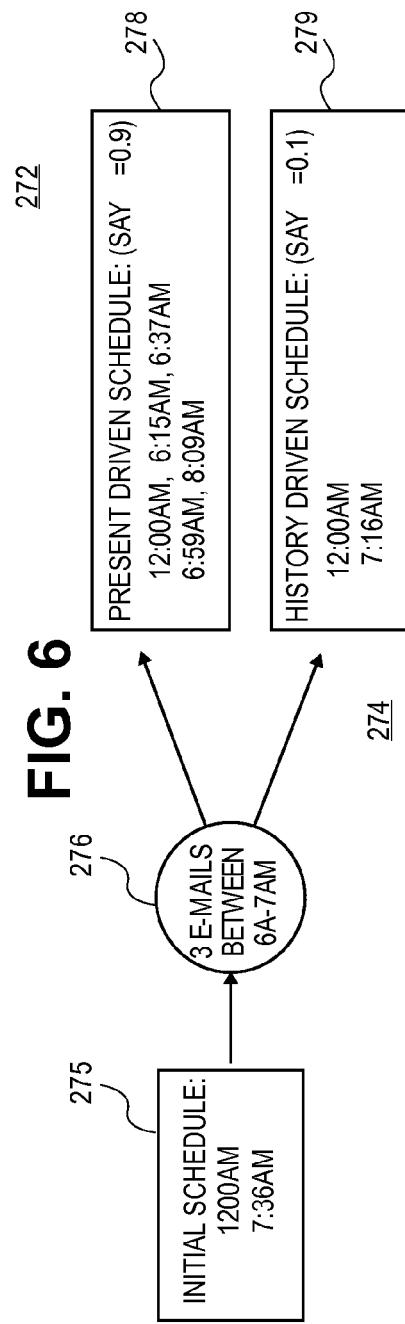
FIG. 6 is a chart showing an average number of e-mails and scheduled wakeups of an MPC system based on e-mail history, according to one embodiment.
FIG. 7 is a block diagram illustrating an adaptive wakeup schedule, in accordance with one embodiment.

FIG. 6 is a sample of what a user's schedule 272 might look like on a Monday, according to one embodiment. Representatively, wakeup times are scheduled to occur for one e-mail on average. Representatively, between 1:00 a.m. and 6:00 a.m., negligible e-mails are received, whereas an average 5.7 e-mails are received between 9:00 a.m. and 9:59 a.m. Hence, wakeups are not scheduled between 12:00 a.m. and 7:00 a.m., a wakeup is scheduled every 10 minutes between 9:00 a.m. and 10:00 a.m.

FIG. 7 is a block diagram illustrating an adaptive wakeup schedule, in accordance with one embodiment. In one embodiment, Adaptivity coefficient '$\alpha$', $0 \leq \alpha \leq 1$ is defined as fraction between completely history-driven ($\alpha=0$) and completely present-driven ($\alpha=1$) scheduling. If the user sets $\alpha=0.1$, the schedule adapts very slowly. If $\alpha=0.9$, it aggressively adapts the schedule to present e-mail activity, as indicated by the following equation.

$$\text{New E-mail Count} = [(1-\alpha) * \text{E-mail Count from history}] + [\alpha * \text{E-mail Count from Present}] \quad (1)$$

Representatively, as indicated by block 275, MPC system 100 went in Standby/Hibernate at 12:00 a.m. and wakeup occurs at 7:36 a.m. From history (see Table 272 (FIG. 6)), we expect one e-mail to arrive by then. Instead, as indicated by block 276, three e-mails are received at 6:10 a.m., 6:15 a.m. and 6:42 a.m. For the 6:00 a.m.-7:00 a.m. slot, the E-mail Count from History was 0.2 (see FIG. 6), and the E-mail Count from Present is 3. In one embodiment, history-driven scheduling (say $\alpha=0.1$) changes the E-mail count for 6 am to 0.48 from 0.2, as indicated by block 279. Conversely, as indicated by block 278, present-driven scheduling (say α=0.9) changes the E-mail count for 6 am to 2.72 from 0.2.

Accordingly, in one embodiment, data sync logic 200 of FIG. 2 enables MPC system 100 to periodically make an Internet/WLAN/WWAN connection, if available, to perform data synchronization without user intervention. In one embodiment, once MPC system 100 is in place into a Standby/Hibernate mode, a timer is set to occasionally wake MPC system 100 for automatic synchronization. As a result, power is saved by primarily keeping the MPC system 100 in low power sleep mode, while synchronization is performed by waking up MPC system 100 occasionally. Accordingly, subsequent to placing MPC system 100 into a sleep mode, when the user returns to awaken the MPC system 100 from sleep mode, the user will discover that all e-mail/critical information is synchronized on MPC system 100 without having to make an Internet connection, even in a place where Internet connectivity is unavailable to simulate the connected scenario.

In one embodiment, the time for which a mobile device can remain active is extended by reducing its power consumption while it is being powered-on. The power consumption of a mobile device is proportional to the operating frequency of its processor. Hence, a processor operating at a higher frequency consumes more battery power than a processor at a lower frequency. Most of the newer processors are capable of changing their operating frequency and allow the system BIOS or operating system (OS) 116 (FIG. 1) to control the operating frequency. However, by default an OS forces the processor to operate at or near full frequency to get better performance and user experience. Therefore, the user does not benefit from the processor's in-built capabilities.

Retrieving e-mail messages is a very computationally simple application, one which does not require the device to operate at full power. Also, the operational speed of the processor is not the primary bottle neck for e-mail retrieval from a remote server because factors like network bandwidth, network latency and server availability play a far more significant role. Accordingly, in one embodiment, MPC system 100, which is being automatically powered-on to retrieve e-mail messages, is caused to run at the lowest possible processor speed to achieve improved power utilization.

Referring again to FIG. 1, MPC system 100 includes speedstep logic 104, according to one embodiment. In one embodiment, speedstep logic 104 enables MPC system to further conserve battery life by providing various processor operating frequencies, as well as voltages referred to herein as "power state conditions." Accordingly, in one embodiment, speedstep logic 104 may direct CPU 102 to reduce the operating speed, as well as lower system voltage, to provide a battery-optimized mode, referred to herein as "CPU throttling." In contrast to conventional processors, speedstep logic enables the throttling of CPU 102 following wakeup from a standby C3 state.

The second major drain on battery power in mobile devices is the liquid crystal display (LCD) screen. If the process of retrieving e-mail messages can be done without any user interaction, then the LCD screen does not need to be switched on during the retrieval process. This, in turn, would lead to an improvement in battery performance.

In one embodiment, when the user puts the device in a low power 'Sleep/Hibernate' state to indicate that the device will no longer be actively used, the device is periodically brought up from the low power state to retrieve e-mail messages. In one embodiment, the processor's speed is forced to remain at the lowest possible level while the application uses an automated e-mail retrieval process, referred to herein as "CPU throttling," which may be activated by "Throttle CPU" button 268 of UI 260/262 of FIGS. 3 and 4. In a further embodiment, the display 130 (FIG. 1) is also forced to remain off during this process. The device is then put back into the low power state until the user resumes normal operation or until the next automatic synchronization window opens.

Figure 8A:
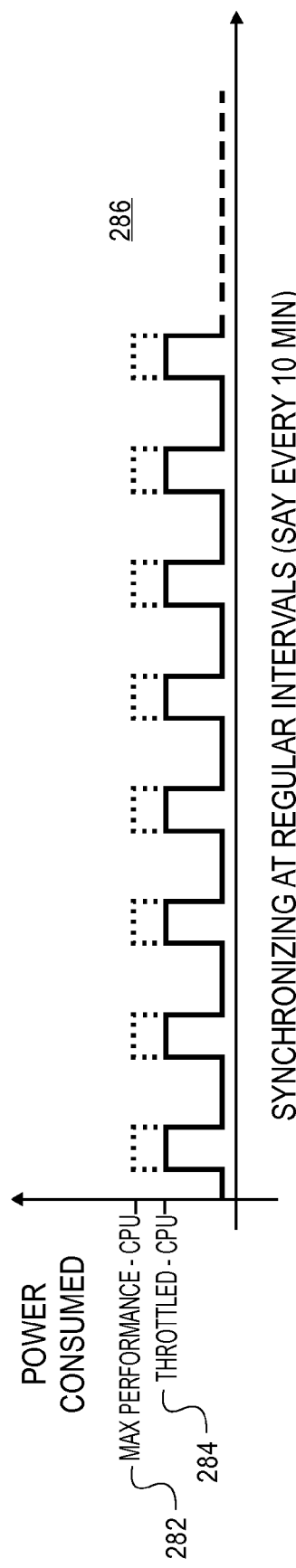
FIGS. 8A and 8B provide a power consumption comparison of a throttled CPU to compare adaptive wakeup scheduling to fixed wakeup scheduling, according to one embodiment.
Figure 8B:
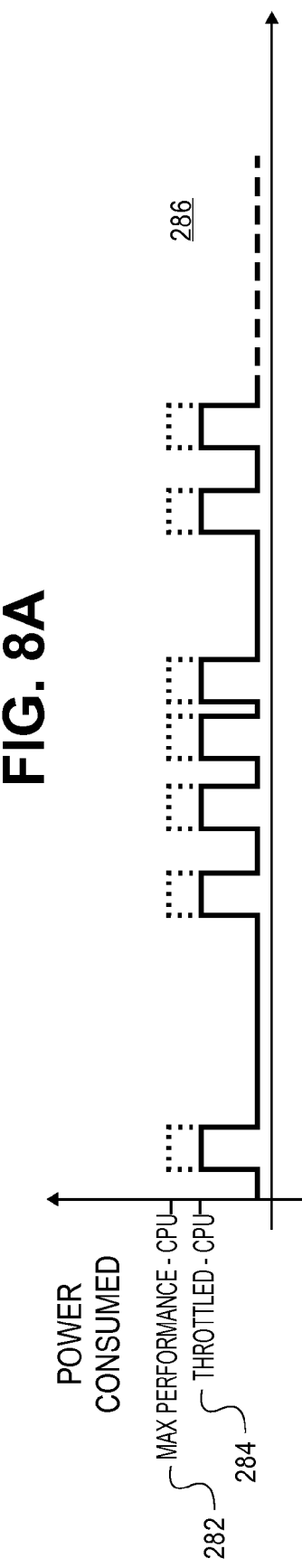

FIGS. 8A and 8B illustrate graphs 280/286 for comparing power consumption based on regular intervals with CPU throttling and synchronization based on adaptive scheduling with CPU throttling. As shown in FIG. 8A, synchronization is performed at regular intervals, such as, for example, every ten minutes. Based on a wakeup interval of ten minutes, a total of 144 wakeups are performed in one day. Conversely, by scheduling wakeups according to e-mail activity, a number of wakeups may be determined as a minimum of 144 wakeups per day versus a sum of the number of e-mails per day.

Representatively, throttling of the CPU provides a ten percent power reduction over non-throttled embodiments. Furthermore, disabling of an LCD 130 (FIG. 1) saves approximately thirty percent power consumption over embodiments where the LCD remains on. Adaptive scheduling saves approximately 55 percent to 62 percent power savings versus periodic synchronization performed every 10 minutes.

Accordingly, in one embodiment, data synchronization logic 200 maintains synchronization of user critical information and does so in a power efficient manner, to simulate a connected scenario for MPC system 100. In one embodiment, the data synchronization logic 200 brings push-style e-mail functionality in a PC architecture-based platform. Conventionally, this feature is only available in handheld devices that have an always on communications subsystem. Procedural methods for implementing one or more of the above-described embodiments are now provided.

Operation

Figure 9:
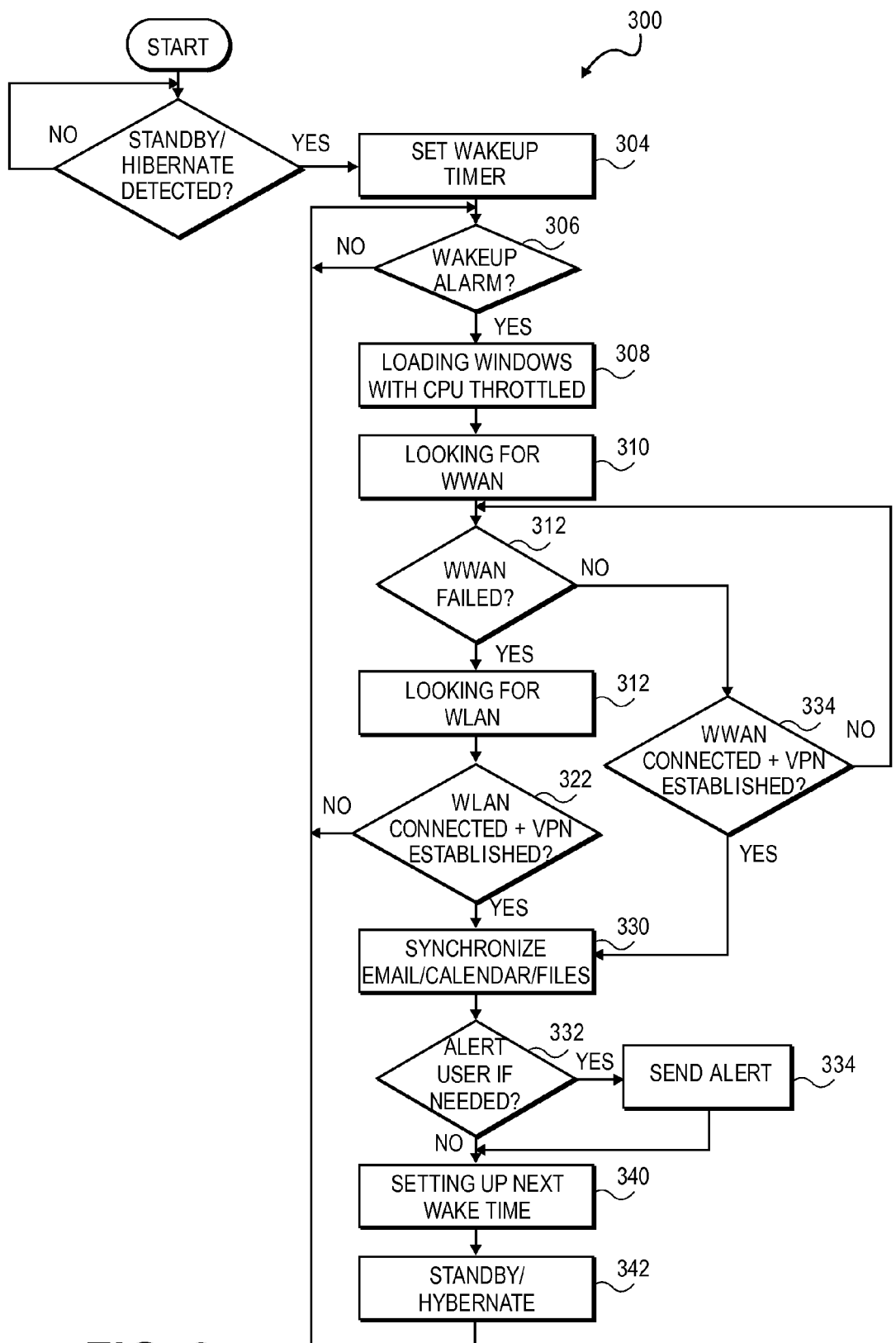
FIG. 9 is a flowchart illustrating a method for providing a power-efficient framework, while maintaining data synchronization of MPC to simulate a connected scenario, according to one embodiment.

Turning now to FIG. 9, the particular methods associated with various embodiments are described in terms of computer software and hardware with reference to a flowchart. The methods to be performed by a computing device (e.g., an MPC system) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 9 is a flowchart illustrating a method 300 for a power-efficient framework to maintain data synchronization of a mobile personal computer to simulate the connected scenario, in accordance with one embodiment. In the embodiments described, examples of the described embodiments are made with reference to FIGS. 1-8B. However, the described embodiments should not be limited to the examples provided to limit the scope provided by the appended claims.

Referring again to FIG. 9, at process block 302, it is determined whether an MPC system, such as MPC system 100 as shown in FIG. 1, has gone into a standby/hibernate mode. In one embodiment, such functionality may be performed by data synchronization code 290 in combination with operating system 116. Conventionally, OS 116 broadcasts a message to applications if either the user or inactivity has caused MPC system 100 to go into a standby/hibernate mode. When such event occurs, OS 116 (FIG. 1) may broadcast a message to all applications. Accordingly, in one embodiment, data sync code 290 (FIG. 1) remains dormant until a message is broadcast that the system will go into a standby/hibernate mode.

Referring again to FIG. 9, at process block 304, in response to standby/hibernate detection, data sync code 209 may set up a system wakeup timer according to e-mail activity and allow MPC system 100 to go to sleep. Assuming the user does not cause MPC system 100 to wakeup, at process block 306, a wakeup alarm may be detected. Once detected, at least one resource of MPC system 100 is disabled/altered. For example, in one embodiment, display 130 of MPC system 100 may be disabled. In addition, data sync code 200 may cause CPU 102 to operate according to a reduced frequency, such as, for example, a minimum frequency by using speedstep logic 104.

Referring again to FIG. 9, at process block 308, MPC system 100 loads OS 116 with a throttled CPU. At process block 310, MPC system 100 may attempt to establish a wireless network connection through a wireless wide area network (WWAN) or a wireless local area network (WLAN) at process block 320. At process block 320, failure to connect to a WWAN will cause MPC system to establish a WLAN connection. Accordingly, MPC system 100 may establish either a WWAN connection or a WLAN connection.

Based on such connection, using, for example, VPN logic 244, at process block 322, MPC system 100 may establish a hands-free connection to a VPN. Once established, at process block 330, e-mails, calendars and other files may be downloaded on MPC system 100 to enable synchronization between the MPC system 100 and a network server. At process block 332, the user may be optionally notified if unread e-mails are detected. Subsequently, a next wakeup alarm is set at process block 340 and MPC system 100 is allowed to return to the standby/hibernate state at process block 342.

Figure 10:
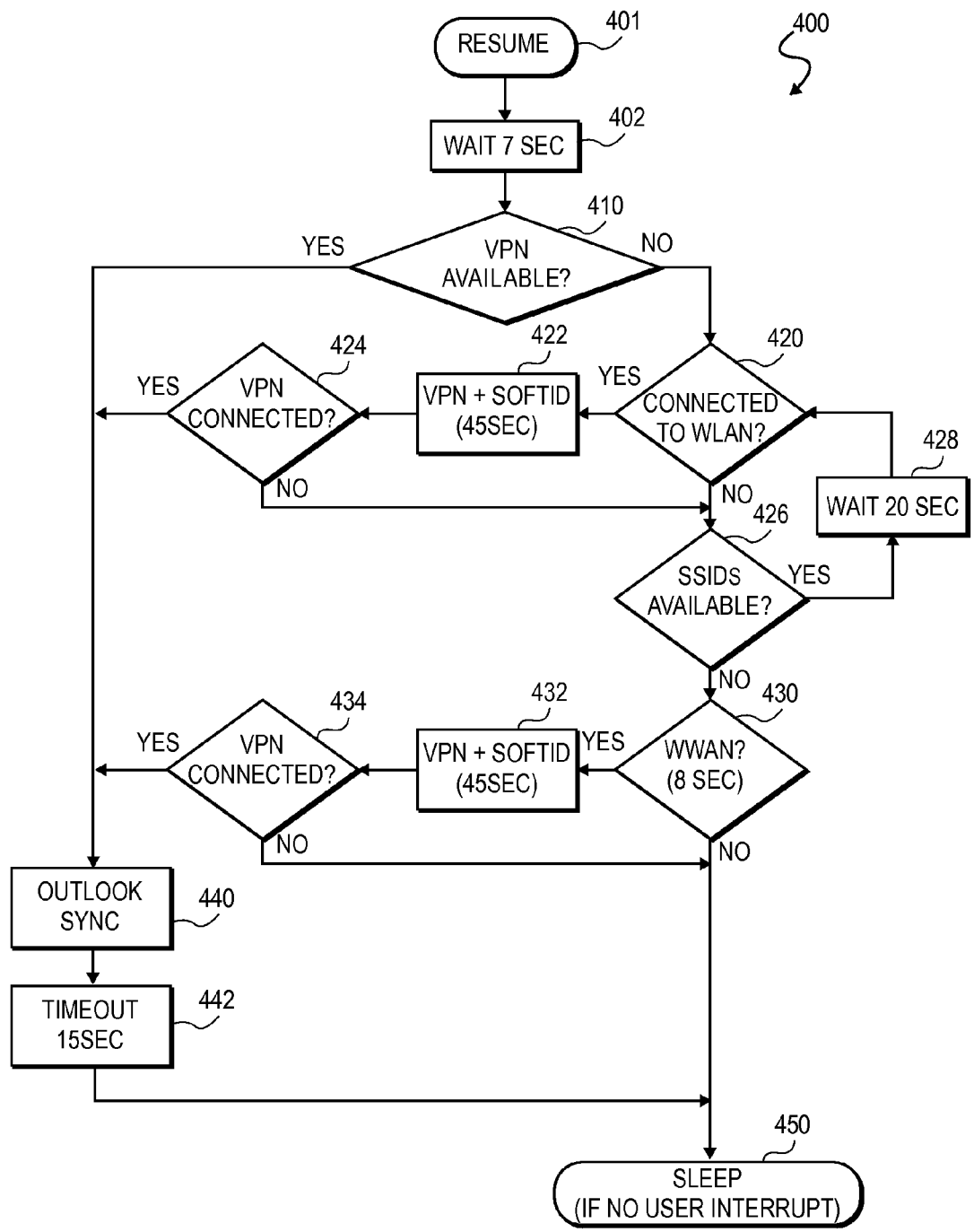
FIG. 10 is a flowchart illustrating a method for connecting with a wireless network, according to one embodiment.

FIG. 10 is a flowchart for a method 400 for performing a wireless network connection without user intervention, according to one embodiment. At process block 401, control resumes to process block 402, where a wait state is encountered. At process block 410, it is determined whether a virtual private network (VPN) is available. If the VPN is available, data synchronization is automatically performed at process block 440. Conversely, if the VPN is not available, at process block 420, a wireless local area network connection is established. If established successfully, at process block 422, a VPN connection is attempted by using a soft identification.

Subsequently, at process block 424, it is determined whether a VPN connection is successfully established. When such is established, control flow transitions to process block 440. Otherwise, access via an wireless wide area network (WWAN) is performed at process block 426. Subsequently, at process block 430, if a WWAN connection is established, connection to a VPN is performed at process blocks 432 and 434. Subsequent to data synchronization, at process block 440, control flow branches to process block 450, where the MPC system is allowed to return to a sleep mode.

Accordingly, as shown in FIG. 10, twenty seconds should be allowed to establish the WLAN connection at process block 428 to check if WLAN is connected and if the wireless card is catching a service set identifier (SSID) for the WLAN, which is determined at process block 426. If the connection is still not made, the WLAN may be dialed up. Accordingly, checks are made to determine if a network connection is available by scanning all network devices for an Internet protocol (IP) addresses and using, for example, Windows Management Instrumentation (WMI) service. If a network connection is unavailable, MPC system 100 may be sent back to sleep.

In one embodiment, once a connection is established, a VPN client may be loaded. In one embodiment, the VPN client waits for a "secure ID authentication" window and throws the soft ID keystrokes at process block 422. Once the VPN connection has been established, data synchronization may be performed by identifying, for example, any new messages without launching, for example, an e-mail interface. In one embodiment, this process is performed while the user is inactive and the display is shut down with the CPU throttled to a lowest frequency mode to save power and avoid thermal issues. In one embodiment, VPN configuration is performed by activating the "HandsFreeVPN" button 264 of UI 260/262 of FIGS. 3 and 4.

Figure 11:
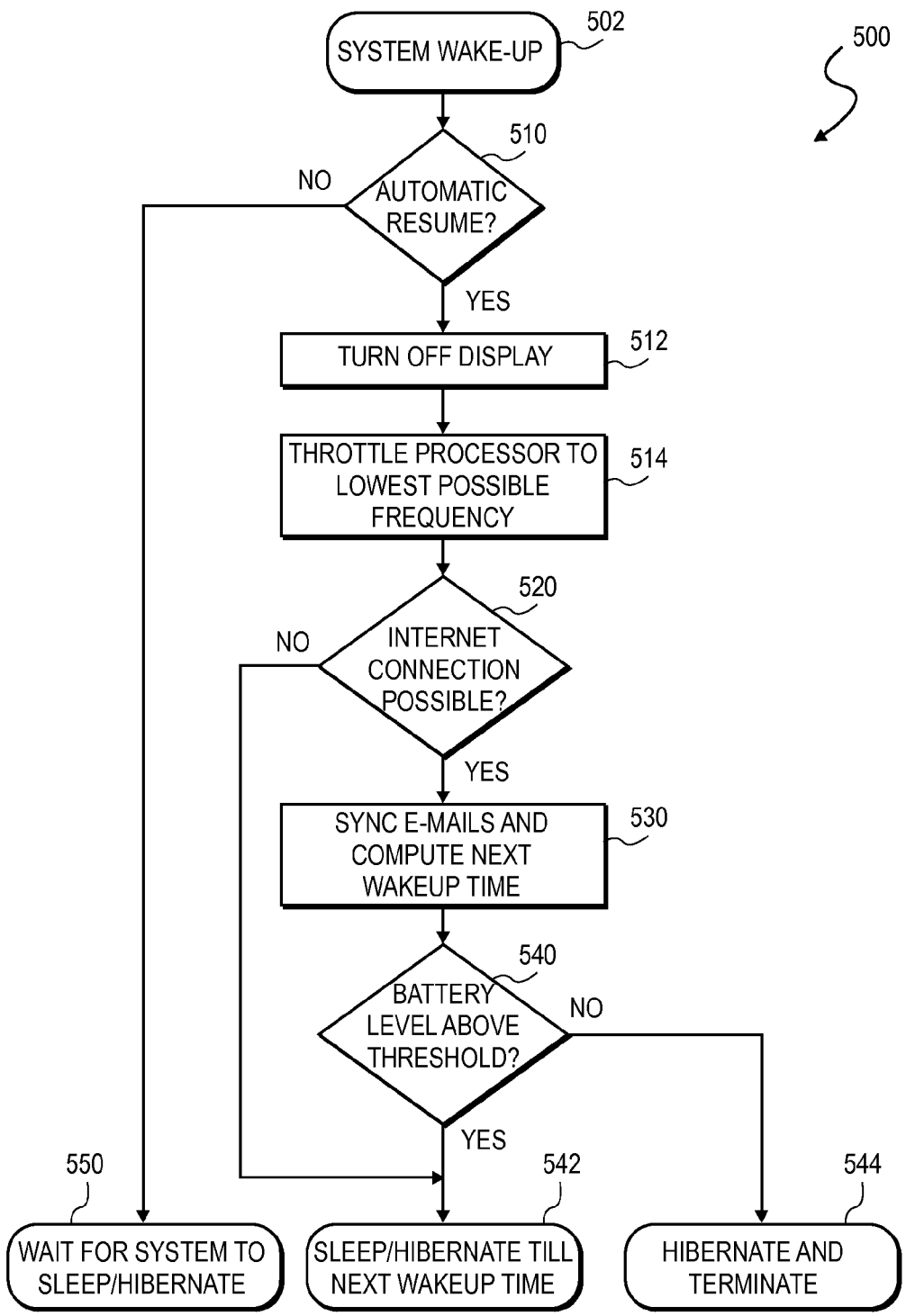
FIG. 11 is a flowchart illustrating a method for improving power performance for a data synchronization scheme based on user e-mail history, according to one embodiment.

FIG. 11 is a flowchart illustrating a method 500 for combining data synchronization according to e-mail activity with further power saving techniques, according to one embodiment. Accordingly, at process block 502, it is determined whether a system wakeup is detected. In one embodiment, system wakeup, according to programming of a timer based on real-time clock 112 may be performed by wakeup schedule code 292, which may be referred to herein as a "data synchronization wakeup event." Accordingly, at process block 510, it is determined whether a data synchronization wakeup event is detected. When such is detected, for example, by the detection of the alarm, data synchronization logic 200 may disable a display 130 (FIG. 1) at process block 512.

Referring again to FIG. 11, at process block 514, CPU 102 may be throttled to a lowest possible frequency using, for example, speedstep logic 104. At process block 520, an Internet connection may be established, for example, as shown in FIG. 10. At process block 530, synchronization of e-mails is performed and a next wakeup time is computed. At process block 540, a determination may be made as to the battery level and whether the battery life is above a predetermined threshold. In one embodiment, if the battery life is below the predetermined threshold, MPC system 100 may be returned to the hibernate and the automatic synchronization terminated. Conversely, if the battery level is above the predetermined threshold, the MPC system is returned to the sleep/hibernate state with the next wakeup time programmed according to the clock 112, as shown in FIG. 1.

In one embodiment, when the system wakes up from a sleep state, it starts the connection and e-mail download process for e-mail synchronization; however, MPC system may keep track of the system temperature using, for example, a skin temperature sensor. There could be cases where the MPC system wakes up inside a laptop bag where there is poor ventilation, causing the MPC system to heat up. In one embodiment, the MPC system sets a future wake-up notification and promptly puts the MPC system back to the sleep state to protect the MPC system from overheating.

Figure 12:
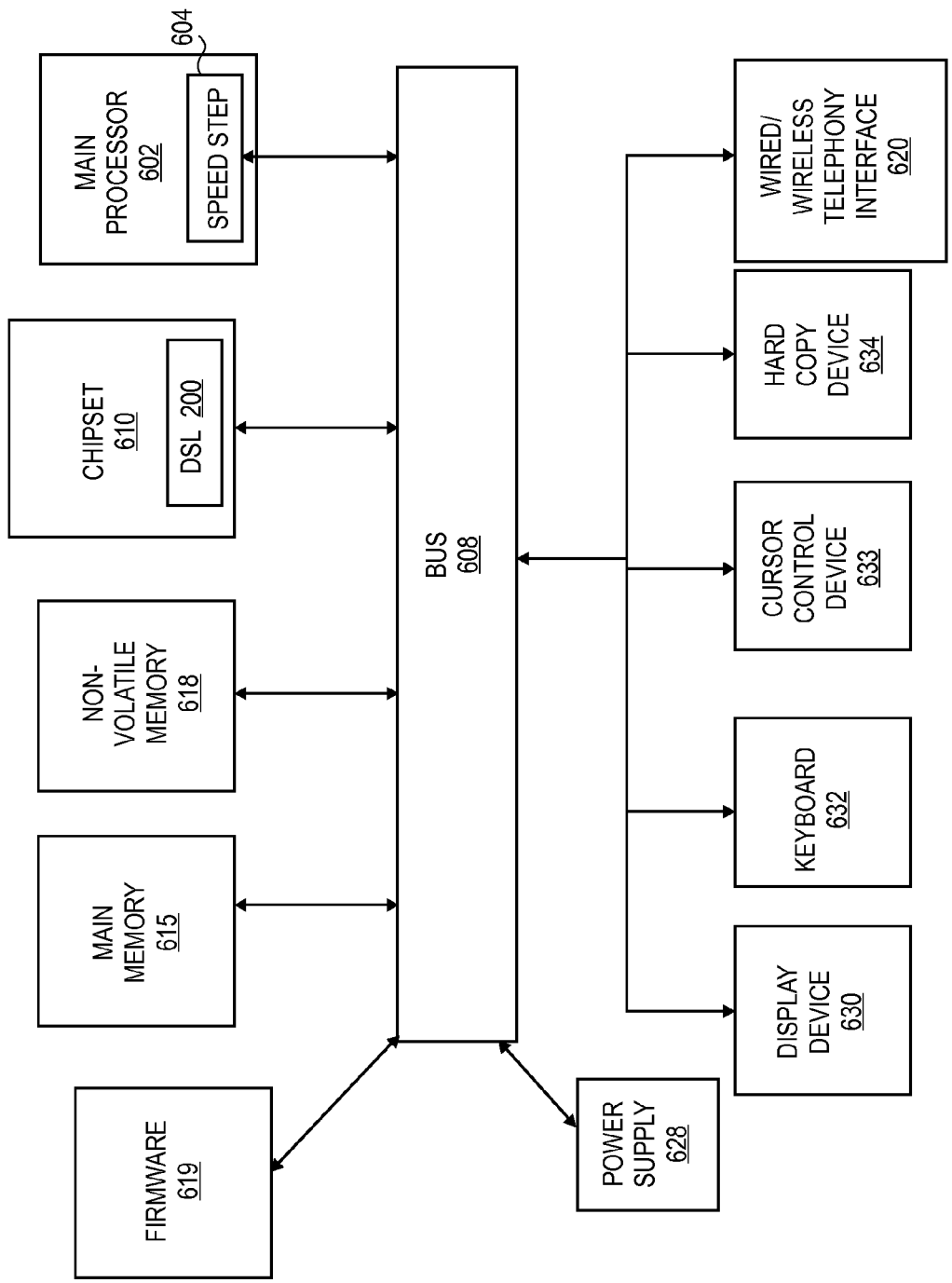
FIG. 12 is a block diagram illustrating a mobile platform architecture to provide a power efficient framework to maintain data synchronization of a mobile platform computer to simulate a connected scenario, according to one embodiment.

FIG. 12 illustrates a block diagram of an example computer system that may use an embodiment of a power-efficient framework to maintain data synchronization of a mobile personal computer to simulate a connected scenario, according to one embodiment. In one embodiment, computer system 600 comprises a communication mechanism or bus 608 for communicating information, and an integrated circuit component such as a main processing unit 602 coupled with bus 608 for processing information. One or more of the components or devices in the computer system 600 such as the main processing unit 602 or a chipset 610 may use an embodiment of the data synchronization logic (DSL) 200. The main processing unit 602 may consist of one or more processor cores working together as a unit.

Computer system 600 further comprises a random access memory (RAM) or other dynamic storage device 615 (referred to as main memory) coupled to bus 608 for storing information and instructions to be executed by main processing unit 602. Main memory 615 also may be used for storing temporary variables or other intermediate information during execution of instructions by main processing unit 602.

Firmware 619 may be a combination of software and hardware, such as Electronically Programmable Read-Only Memory (EPROM) that has the operations for the routine recorded on the EPROM. The firmware 619 may embed foundation code, basic input/output system code (BIOS), or other similar code. The firmware 619 may make it possible for the computer system 600 to boot itself.

Computer system 600 also comprises a read-only memory (ROM) and/or other static storage device 618 coupled to bus 608 for storing static information and instructions for main processing unit 602. The static storage device 618 may store OS level and application level software.

Computer system 600 may further be coupled to or have an integral display device 630, such as a cathode ray tube (CRT) or liquid crystal display (LCD), coupled to bus 608 for displaying information to a computer user. A chipset may interface with the display device 630.

An alphanumeric input device (keyboard) 632, including alphanumeric and other keys, may also be coupled to bus 608 for communicating information and command selections to main processing unit 602. An additional user input device is cursor control device 633, such as a mouse, trackball, trackpad, stylus, or cursor direction keys, coupled to bus 608 for communicating direction information and command selections to main processing unit 602, and for controlling cursor movement on a display device 630. A Chipset may interface with the input/output devices.

Another device that may be coupled to bus 608 is a power supply such as a battery and Alternating Current adapter circuit. Furthermore, a sound recording and playback device, such as a speaker and/or microphone (not shown) may optionally be coupled to bus 608 for audio interfacing with computer system 600. Another device that may be coupled to bus 608 is a wireless communication module 620. The wireless communication module 620 may employ a Wireless Application Protocol to establish a wireless communication channel. The wireless communication module 620 may implement a wireless networking standard, such as the 802.11 Standard.

In one embodiment, the software used to facilitate the routine can be embedded onto a machine-readable medium. A machine-readable medium includes any mechanism that provides (i.e., stores and/or transmits information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Figure 13:
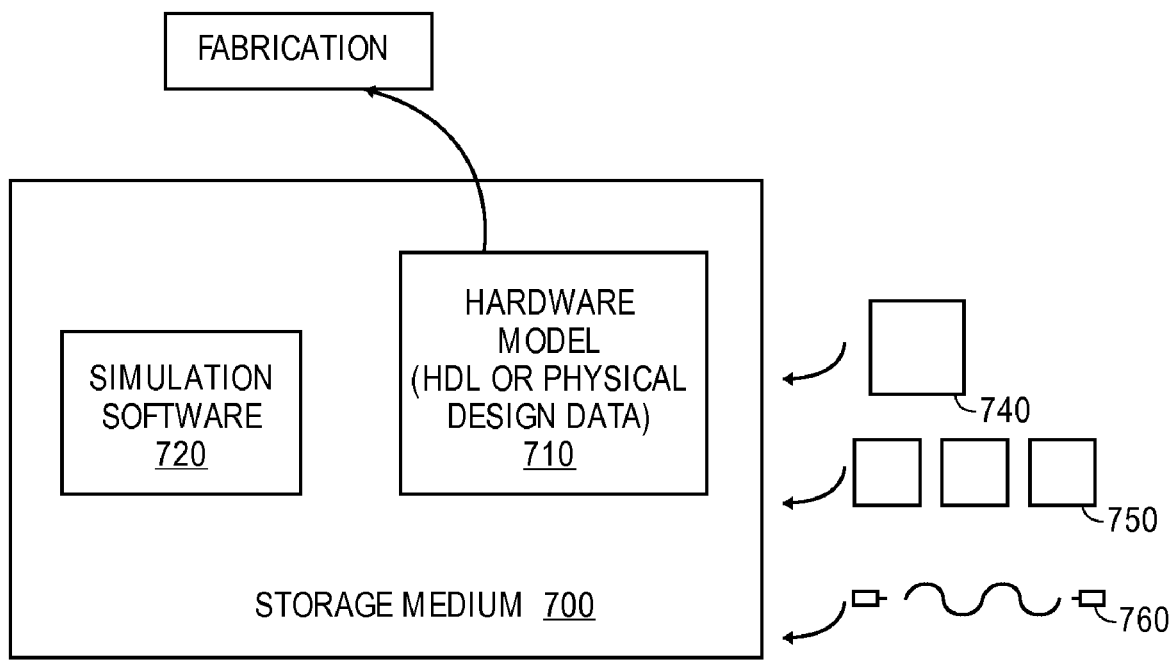
FIG. 13 is a block diagram illustrating various design representations or formats for simulation, emulation and fabrication of a design using the disclosed techniques.

FIG. 13 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

In any representation of the design, the data may be stored in any form of a machine readable medium. An optical or electrical wave 760 modulated or otherwise generated to transport such information, a memory 750 or a magnetic or optical storage 640, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 102, for other embodiments, a multiprocessor system (where one or more processors may be similar in configuration and operation to the CPU 102 described above) may benefit from the power-efficient framework to maintain data synchronization of a mobile personal computer (MPC) in a connected scenario of various embodiments. Further different type of system or different type of computer system such as, for example, a server, a workstation, a desktop computer system, a gaming system, an embedded computer system, a blade server, etc., may be used for other embodiments.

Elements of the described embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments that may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
   detecting a data synchronization wakeup event while a computer system is operating according to a sleep state, wherein detecting includes receiving a wakeup notification according to a timer, wherein the timer is set to periodically wakeup a system based on a user history profile, and querying a table to determine the minimum number of resources required to re-establish the network connection;
   disabling at least one system resource of the computer system to provide a minimum number of system resources required to re-establish a network connection;
   synchronizing user data from a network server with the computer system without user intervention to simulate a connection scenario; and
   resuming operation of the computer system according to the sleep state.

2. The method of claim 1, wherein disabling the at least one system resource further comprises: disabling a display for operation in a low power state.

3. The method of claim 1, further comprising:
   throttling a system processor to operate at a reduced frequency.

4. The method of claim 1, wherein synchronizing user data further comprises:
   scanning any number of possible networks to establish Internet connectivity without user intervention;
   establishing the network connection, wherein the network connection includes a secure wireless network connection; and
   retrieving user e-mail from the network server according to a user profile.

5. The method of claim 1, further comprising:
   creating the user history profile regarding e-mails received by the user; and
   generating a computer wakeup schedule to synchronize system wakeup according to the receive e-mail messages; and
   programming a next wakeup alarm according to at least the user history profile.

6. The method of claim 1, wherein the computer system comprises: a mobile platform system.

7. The method of claim 1, wherein detecting wake-up notification further comprises:
   checking a current battery life;
   canceling future wake-up notification if the battery life is below a predetermined threshold; and
   resuming the sleep state.

8. An article of manufacture having a machine accessible medium having stored thereon instructions, wherein the instructions, when accessed by a machine, results in the machine performing operations comprising:
   detecting a data synchronization wakeup event while a computer system is operating according to a sleep state, wherein detecting includes receiving a wakeup notification according to a timer, wherein the timer is set to periodically wakeup a system based on a user history profile, and querying a table to determine the minimum number of resources required to re-establish the network connection;
   disabling at least one system resource of the computer system to provide a minimum number of system resources required to re-establish a network connection;
   synchronizing user data from a network server with the computer system without user intervention to simulate a connection scenario; and
   resuming operation of the computer system according to the sleep state.

9. The article of manufacture of claim 8, wherein disabling the at least one system resource further comprises: disabling a display for operation in a low power state.

10. The article of manufacture of claim 8, wherein the computer system comprises: a mobile platform system.

11. The article of manufacture of claim 8, wherein synchronizing user data further comprises:
    scanning any number of possible networks to establish Internet connectivity without user intervention;
    establishing the network connection, wherein the network connection includes a secure wireless network connection; and
    retrieving user e-mail from the network server according to a user profile.

12. A system comprising:
    a clock to trigger a wakeup alarm;
    a battery power source;
    a processor coupled to the battery, the processor having at least one power state condition to cause the processor to perform a selectable operating mode;
    a chipset coupled to the processor, the chipset including logic to disabling at least one system resource to provide a minimum number of system resources to re-establish a wireless network connection when a data synchronization wakeup event is detected in response to a wakeup a communications interface to re-establish the wireless network logic to synchronize system data with a network server without user intervention and to resume the sleep state, wherein detecting includes receiving a wakeup notification according to a timer, wherein the timer is set to periodically wakeup a system based on a user history profile, and querying a table to determine the minimum number of resources required to re-establish the network connection.

13. The system of claim 12, further comprising:
    a display, the display to be disabled in response to detection of the data synchronization wakeup event.

14. The system of claim 12, wherein the logic is further to throttle the processor to operate at a reduced frequency according to a selected operating mode.

15. The system of claim 12, further comprising:
wakeup logic to create a user history profile regarding e-mails received by the user and to generate a computer wakeup schedule to synchronize system wakeup according to received e-mail messages.

16. An apparatus comprising
first logic to detect a data synchronization wakeup event while a computer system is operating according to a sleep state, wherein detecting includes receiving a wakeup notification according to a timer, wherein the timer is set to periodically wakeup a system based on a user history profile, and querying a table to determine the minimum number of resources required to re-establish the network connection;
second logic to disable at least one system resource of the computer system to provide a minimum number of system resources required to re-establish a network connection;
third logic to synchronize user data from a network server with the computer system without user intervention to simulate a connection scenario; and
forth logic to resume operation of the computer system according to the sleep state.

17. The apparatus of claim 16, wherein disabling the at least one system resource further comprises: disabling a display for operation in a low power state.

18. The apparatus of claim 16, wherein the computer system comprises: a mobile platform system.

19. The apparatus of claim 16, wherein the third logic to synchronize is further to:
scan any number of possible networks to establish Internet connectivity without user intervention;
establish the network connection, wherein the network connection includes a secure wireless network connection; and
retrieve user e-mail from the network server according to a user profile.

* * * * *